US007287222B2

(12) United States Patent
Takata et al.

(10) Patent No.: US 7,287,222 B2
(45) Date of Patent: Oct. 23, 2007

(54) INFORMATION PROCESSING APPARATUS AND METHOD THAT DETERMINES EFFECTIVENESS OF METADATA FOR EDITING INFORMATION CONTENT

(75) Inventors: Tomomi Takata, Kanagawa (JP); Hidetomo Sohma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 10/351,300

(22) Filed: Jan. 27, 2003

(65) Prior Publication Data
US 2003/0142124 A1 Jul. 31, 2003

(30) Foreign Application Priority Data
Jan. 31, 2002 (JP) ............... 2002-024109
Feb. 15, 2002 (JP) ............... 2002-039037

(51) Int. Cl.
*G06F 17/00* (2006.01)
(52) U.S. Cl. ...................... 715/531; 715/530
(58) Field of Classification Search ........... 715/530, 715/513, 531, 501.1
See application file for complete search history.

(56) References Cited

U.S. PATENT DOCUMENTS

| 5,493,677 A * | 2/1996 | Balogh et al. ........... 707/104.1 |
| 6,523,046 B2 * | 2/2003 | Liu et al. .............. 707/104.1 |
| 6,591,265 B1 * | 7/2003 | Erickson et al. ............ 707/9 |
| 6,760,734 B1 * | 7/2004 | Stephens ................ 707/102 |
| 6,792,047 B1 * | 9/2004 | Bixby et al. ........... 375/240.26 |
| 7,107,520 B2 * | 9/2006 | Gargi ................... 715/512 |
| 2002/0069218 A1 * | 6/2002 | Sull et al. .............. 707/501.1 |
| 2002/0105549 A1 * | 8/2002 | Yokota ................ 345/824 |
| 2002/0129058 A1 * | 9/2002 | Story et al. ............. 707/513 |
| 2002/0152278 A1 * | 10/2002 | Pontenzone et al. ........ 709/217 |
| 2002/0159640 A1 * | 10/2002 | Vaithilingam et al. ....... 382/218 |
| 2002/0178370 A1 * | 11/2002 | Gurevich et al. ............ 713/189 |
| 2003/0002715 A1 * | 1/2003 | Kowald ................ 382/118 |
| 2003/0051113 A1 * | 3/2003 | Beardsley et al. .......... 711/163 |
| 2003/0135765 A1 * | 7/2003 | Hind et al. .............. 713/202 |
| 2003/0177286 A1 * | 9/2003 | Gould .................. 709/331 |
| 2003/0217031 A1 * | 11/2003 | Owen et al. .............. 707/1 |
| 2004/0003013 A1 * | 1/2004 | Coulthard et al. ........... 707/205 |
| 2004/0098362 A1 * | 5/2004 | Gargi ................... 707/1 |
| 2004/0123109 A1 * | 6/2004 | Choi ................... 713/176 |
| 2005/0262103 A1 * | 11/2005 | Stakutis et al. ........... 707/10 |

FOREIGN PATENT DOCUMENTS

| JP | 8-77116 | 3/1996 |
| JP | 2001-043118 A | 2/2001 |
| JP | 2001-189940 A | 7/2001 |
| JP | 2001-298697 A | 10/2001 |
| JP | 2002-015333 A | 1/2002 |

* cited by examiner

*Primary Examiner*—Stephen Hong
*Assistant Examiner*—Adam M. Queler
(74) *Attorney, Agent, or Firm*—Fitzpatrick, Cella, Harper & Scinto

(57) ABSTRACT

Metadata corresponding to each segment is added to a content. Each metadata describes a metadata item such as the dominant color or person of the segment. Each metadata item describes metametadata for representing an editing content to the content that influences the effectiveness of the metadata item. When the content is edited, an information processing apparatus adds to the metametadata a description representing executed editing. From the metametadata, the information processing apparatus which processes the content can determine the effectiveness of each metadata item. As a result, the effectiveness of each metadata can be reliably determined.

17 Claims, 13 Drawing Sheets

FIG. 3

```
3-a:    <Metadata>
3-b:        <Segment StartTime="00:02:12", EndTime="00:04:34">
3-c:            <DominantColor>
3-d:                <Metameta>
3-e:                    <DisableOperation ColorChange />
3-f:                    <DisableOperation VideoEdit />
3-g:                    <OperationRecord ColorChange />
3-h:                </Metameta>
3-i:                <RGB R=#20, G=#30, B=#40 />
3-j:            </DominantColor>
3-k:            <Dialog>
3-l:                <Metameta>
3-m:                    <DisableOperation AudioChange />
3-n:                    <OperationRecord ColorChange />
3-o:                </Metameta>
3-p:                <Element Voice="Hello" />
3-q:            </Dialog>
3-r:            <Semantics>
3-s:                <Metameta>
3-t:                    <DisableOperation Nothing />
3-u:                </Metameta>
3-v:                <agent name="Ichiro Suzuki" />
3-w:            </Semantics>
3-x:        </Segment>
3-y:    </Metadata>
```

FIG. 8

```
8-a:    <Metadata>
8-b:        <Segment StartTime="00:02:12", EndTime="00:04:34">
8-c:            <DominantColor>
8-d:                <Metameta>
8-e:                    <DisableOperation URL=http://www.foo.bar/DC.xml />
8-f:                    <OperationRecord ColorChange />
8-g:                </Metameta>
8-h:                <RGB R=#20, G=#30, B=#40 />
8-i:            </DominantColor>
8-j:            <Dialog>
8-k:                <Metameta>
8-l:                    <DisableOperation URL=http://www.foo.bar/Dialog.xml />
8-m:                    <OperationRecord ColorChange />
8-n:                </Metameta>
8-o:                <Element Voice="Hello" />
8-p:            </Dialog>
8-q:            <Semantics>
8-r:                <Metameta>
8-s:                    <DisableOperation URL=http://www.foo.bar/SMT.xml />
8-t:                </Metameta>
8-u:                <agent name=" Ichiro Suzuki " />
8-v:            </Semantics>
8-w:        </Segment>
8-x:    </Metadata>
```

FIG. 10

```
10-a:   <Metadata>
10-b:       <Segment StartTime="00:02:12", EndTime="00:04:34">
10-c:           <DominantColor>
10-d:               <Metameta>
10-e:                   <DisableOperation ColorChange />
10-f:                   <DisableOperation VideoEdit />
10-g:               </Metameta>
10-h:               <RGB R=#20, G=#30, B=#40 />
10-i:           </DominantColor>
10-j:           <Dialog>
10-k:               <Metameta>
10-l:                   <DisableOperation AudioChange />
10-m:               </Metameta>
10-n:               <Element Voice="Hello" />
10-o:           </Dialog>
10-p:           <Semantics>
10-q:               <Metameta>
10-r:                   <DisableOperation Nothing />
10-s:               </Metameta>
10-t:               <agent>
10-u:                   <person name=" Ichiro Suzuki" />
10-v:               </agent>
10-w:           </Semantics>
10-x:       </Segment>
10-y:   </Metadata>
```

F I G. 12

| EDITING/EFFECT NAME | DOMINANT COLOR METADATA (DominantColor) | DIALOG METADATA (Dialog) | PHOTOGRAPHING OBJECT METADATA (Semantics) |
|---|---|---|---|
| SEPIA PROCESSING | NOT LEFT | LEFT | LEFT |
| POSTRECORDING PROCESSING | LEFT | NOT LEFT | LEFT |

FIG. 13

```
13-a:   <Metadata>
13-b:       <Segment StartTime="00:02:12", EndTime="00:04:34">
13-c:           <DominantColor>
13-d:               <Metameta>
13-e:                   <DisableOperation URL=http://www.foo.bar/DC.xml />
13-f:               </Metameta>
13-g:               <RGB R=#20, G=#30, B=#40 />
13-h:           </DominantColor>
13-i:           <Dialog>
13-j:               <Metameta>
13-k:                   <DisableOperation URL=http://www.foo.bar/Dialog.xml />
13-l:               </Metameta>
13-m:               <Element Voice="Hello" />
13-n:           </Dialog>
13-o:           <Semantics>
13-p:               <Metameta>
13-q:                   <DisableOperation URL=http://www.foo.bar/SMT.xml />
13-r:               </Metameta>
13-s:               <agent>
13-t:                   <person name=" Ichiro Suzuki" />
13-u:               </agent>
13-v:           </Semantics>
13-w:       </Segment>
13-x:   </Metadata>
```

INFORMATION PROCESSING APPARATUS AND METHOD THAT DETERMINES EFFECTIVENESS OF METADATA FOR EDITING INFORMATION CONTENT

FIELD OF THE INVENTION

The present invention relates to an information processing apparatus and method using metadata.

BACKGROUND OF THE INVENTION

It becomes popular to incorporate computers in home appliances for their control and information processing along with higher performance and lower cost of small-size computer systems. High-quality contents such as images and sounds including videos and music provided by digital data are being supplied. Multimedia contents containing a mixture of images and sounds are also being spread. Such contents can be easily acquired and enjoyed by recent prevalence of the Internet as a global computer network and the implementation of low-cost mobile communication.

Home video devices are shifting from ones which allow the user to record analog broadcasting programs and enjoy images and music supplied by media to ones which record and play back moving pictures and sounds as high-quality digital data free from any degradation. For example, small-size, low-cost digital video recording apparatuses which can process digital data, and digital video cameras which can be purchased by ordinary people have appeared. Digital video shooting is done in home, and video images can be watched and enjoyed.

This increases opportunities for performing video shooting and editing in home, which have been done by broadcasting companies and the like. Broadcasting companies and the like have advanced devices for performing shooting and editing, and technicians with advanced techniques for performing editing and arrangement which simplify contents. However, no advanced device or technician is prepared in home. Hence, contents shot by a home video camera are rarely edited due to the necessity of an expensive device and advanced editing technique. In addition to moving pictures shot in home, information and contents distributed to home are increased by various media and communication means such as the Internet. Such information and contents are changing to multimedia information and contents including moving pictures and sounds. An information search function for these contents becomes very important.

With growing infrastructures such as the Internet for distributing and providing information, even an individual can provide information, and information including moving pictures and sounds is being provided. In the future, the need for a search function and the like for multimedia information and content information on the Internet are expected to increase. The search function must be easily treated by even a user without any special knowledge.

Further, the latest information and contents can be easily distributed in real time by always-on connection of the Internet or mobile communication. It is very important even for broadcasting companies and the like to efficiently acquire, edit, and retouch the latest images and the like. In this situation, demands have arisen for a function of quickly searching for existing information or contents and reflecting them on new information or contents, and a function of easily editing and processing the contents.

Information such as a moving picture which captures contents changing over time with a large information amount is heavy for accumulation. It is difficult to easily search for the contents of such information. Of digital data, document data allows the computer to easily search for a portion containing a character or word by designating the character or word. As for moving pictures and sounds, it is rare to present completely the same information and cause the computer to search for it. The computer generally searches for a similar portion in some sense. With the current techniques, it is difficult for the computer to understand contents expressed by an image, sound, or the like. It is also very difficult to search for contents.

In this fashion, contents to be processed, such as video contents, are increasing. Easy search, editing, and processing of contents are strongly required.

In this environment, devices which hold the features or characteristics of contents as metadata inside or outside the contents and realize a search function using the information, instead of interpreting a large amount of contents, have appeared.

For example, there is proposed a method of facilitating the search and use of information by adding, as metadata to a content or information such as a moving picture, still picture, or sound, a verbal description such as a keyword or caption representing the contents or features, or nonverval information which describes the feature of an image or sound in a format which can be easily processed by a computer.

As for metadata, common formatting by MPEG-7 and the like is being established. However, metadata have large amounts and vary, and not all the devices can process various large-amount metadata. For this reason, devices which utilize metadata always have a possibility of encountering unknown metadata, but possess only a function of ignoring it.

Along with addition of various metadata, each manufacturer creates by itself a system for storing metadata, or the system is upgraded over and over. As a result, unknown metadata or metadata which cannot be processed due to device specifications appears for another manufacturer or a system of a past version. Even for such metadata, the system must perform basic processing and have at least a copy function; otherwise, it becomes difficult to merely add the metadata to contents.

If contents undergo editing which influences the description of metadata, the metadata may become unavailable. For example, when the color of a given segment of a content is changed to the sepia color, metadata which describes the dominant color of the segment becomes insignificant. If the apparatus which executes editing does not cope with the metadata, this means that ineffective metadata is kept added, failing to correctly use the metadata.

In this way, various multimedia contents such as moving pictures, still pictures, and sounds are assigned metadata and used. In this situation, if a multimedia content is edited and processed, the characteristic or state of the metadata may change, or the metadata may become unavailable.

To solve this problem, there is proposed a system as disclosed in Japanese Patent Laid-Open No. 08-077116. This system comprises a central processing apparatus which determines a processing distribution method using an object (data) and attribute (metadata) in accordance with the attribute and various states in order to execute load distribution using an object-oriented data management method. The processing apparatus can instruct a proper processing portion to execute proper processing. However, the central processing apparatus must be separately prepared in this system, greatly decreasing the degree of freedom in system design and use. Since processing is merely distributed, the determination method of the central processing apparatus must be changed upon adding an object (data) which requires a new processing method.

SUMMARY OF THE INVENTION

The present invention has been made to overcome the conventional drawbacks, and has as its object to enable reliably determining the effectiveness of each metadata.

It is another object of the present invention to enable updating metadata in accordance with processing regardless of whether a device which performs processing can process the metadata when a content is processed.

According to the present invention, the foregoing object is attained by providing an information processing apparatus comprising:

holding means for holding a content which is assigned metadata containing a first description for representing an editing content to the content that influences effectiveness of the metadata;

editing means for editing the content; and determination means for determining the effectiveness of the metadata on the basis of the editing content by the editing means and the first description.

According to another aspect of the present invention, the foregoing object is attained by providing an information processing method comprising:

the holding step of causing holding means to hold a content which is assigned metadata containing a first description for representing an editing content to the content that influences effectiveness of the metadata;

the editing step of editing the content; and the determination step of determining the effectiveness of the metadata on the basis of the editing content in the editing step and the first description.

In still another aspect of the present invention, the foregoing object is attained by providing a content data file comprising:

a content formed from video information and/or audio information; and metadata added to the content, the metadata having a description for representing an editing content to the content that influences effectiveness of the metadata.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing metadata used in the apparatus of the embodiment, and XML description data as an example of the metadata;

FIG. 8 is a view showing a description example of metadata and metametadata according to the second embodiment;

FIG. 10 is a view showing an XML description example of metadata and metametadata used in an apparatus of the third embodiment;

FIG. 12 is a table for explaining editing and the determination result of the effectiveness of a metadata item by the metadata description example shown in FIG. 10; and FIG. 13 is a view showing an XML description example of metadata and metametadata according to the fourth embodiment.

DETAILED DESCRIPTION OF THE PREFERRED EMBODIMENTS

Preferred embodiments of the present invention will now be described in detail in accordance with the accompanying drawings.

First Embodiment

Figure 1:
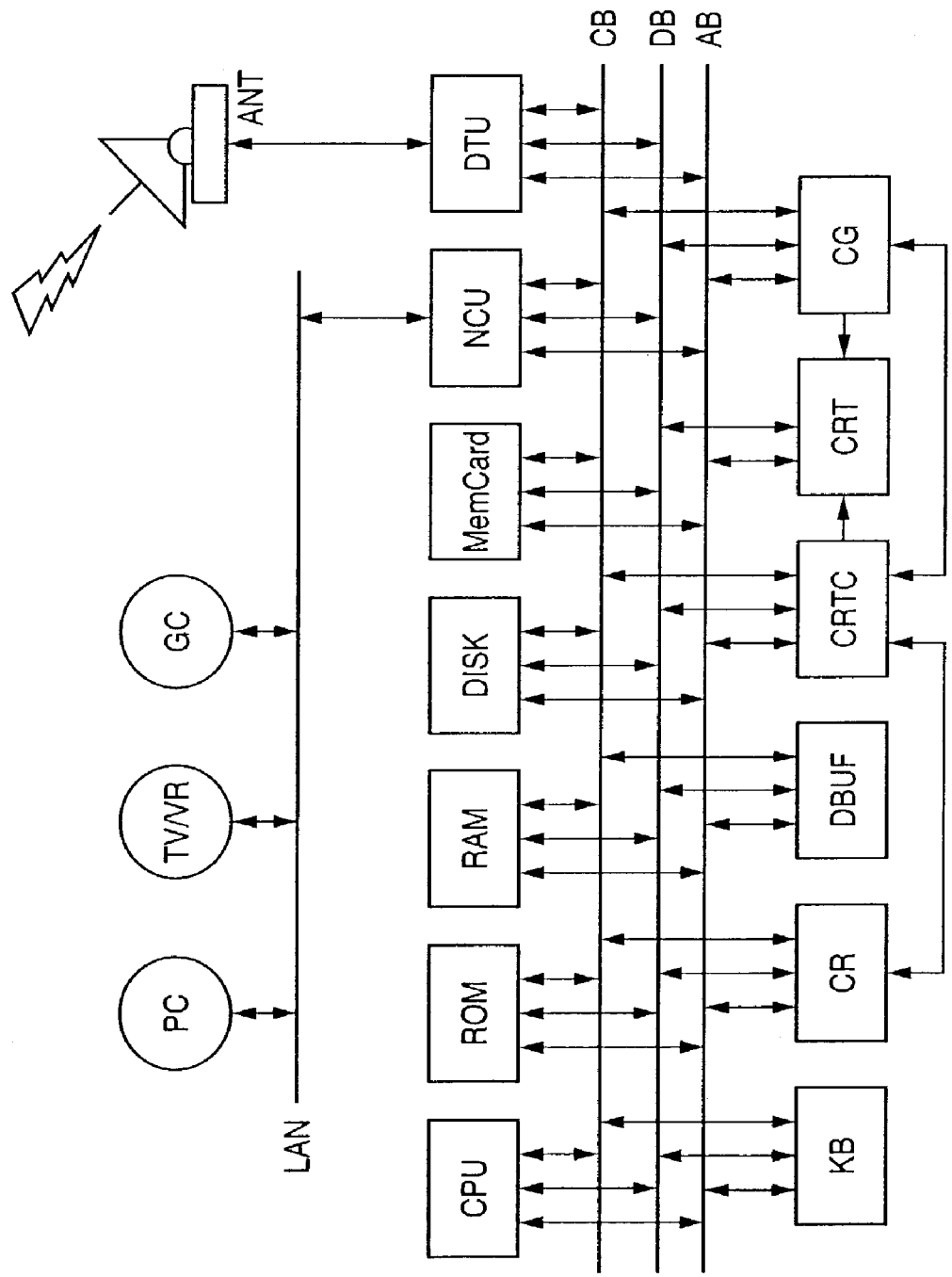
FIG. 1 is a block diagram showing an overall arrangement of an apparatus according to a preferred embodiment.

FIG. 1 is a block diagram showing an arrangement of an information processing apparatus which realizes metadata use processing according to preferred embodiments.

In the arrangement shown in FIG. 1, a microprocessor (CPU) performs calculation, logic determination, and the like for various processes, and controls, via an address bus (AB), control bus (CB), and data bus (DB), building components connected to these buses. Processing contents are designated by computer programs in a ROM and RAM to be described later. A plurality of computer programs can be parallel-operated by the function of the CPU and the mechanisms of the computer programs.

The address bus (AB) transfers an address signal which designates a building component to be controlled by the microprocessor (CPU). The control bus (CB) transfers a control signal for each building component to be controlled by the microprocessor (CPU), and supplies the control signal. The data bus (DB) executes data transfer between building devices.

A ROM (Read-Only Memory) has a computer program area and data area where control procedures by the microprocessor (CPU) (to be described later) are stored.

A RAM (rewritable Random Access Memory) is used as a computer program area and data area where control procedures by the microprocessor (CPU) (to be described later) are stored, and as a temporary storage area for various computer programs and various data from building components except the microprocessor (CPU).

Storage media such as the ROM and RAM store various computer programs and data. Program codes stored in these storage media are read out and executed by the system or apparatus computer, realizing various functions. The storage media which store program codes are not limited to the ROM and RAM, and any storage medium can be used.

In some cases, a recording medium which stores programs and data according to the present invention is supplied to the system or apparatus, and the programs are copied from the recording medium onto a rewritable storage medium such as a RAM. As this storage medium, a CD-ROM, floppy disk, hard disk, memory card, magneto-optical disk can be used.

Various computer programs and data are actually stored in the RAM. These computer programs and data include a computer program which realizes metadata processing according to the embodiment. This computer program is the embodiment itself, which will be described in detail later.

Figure 2:
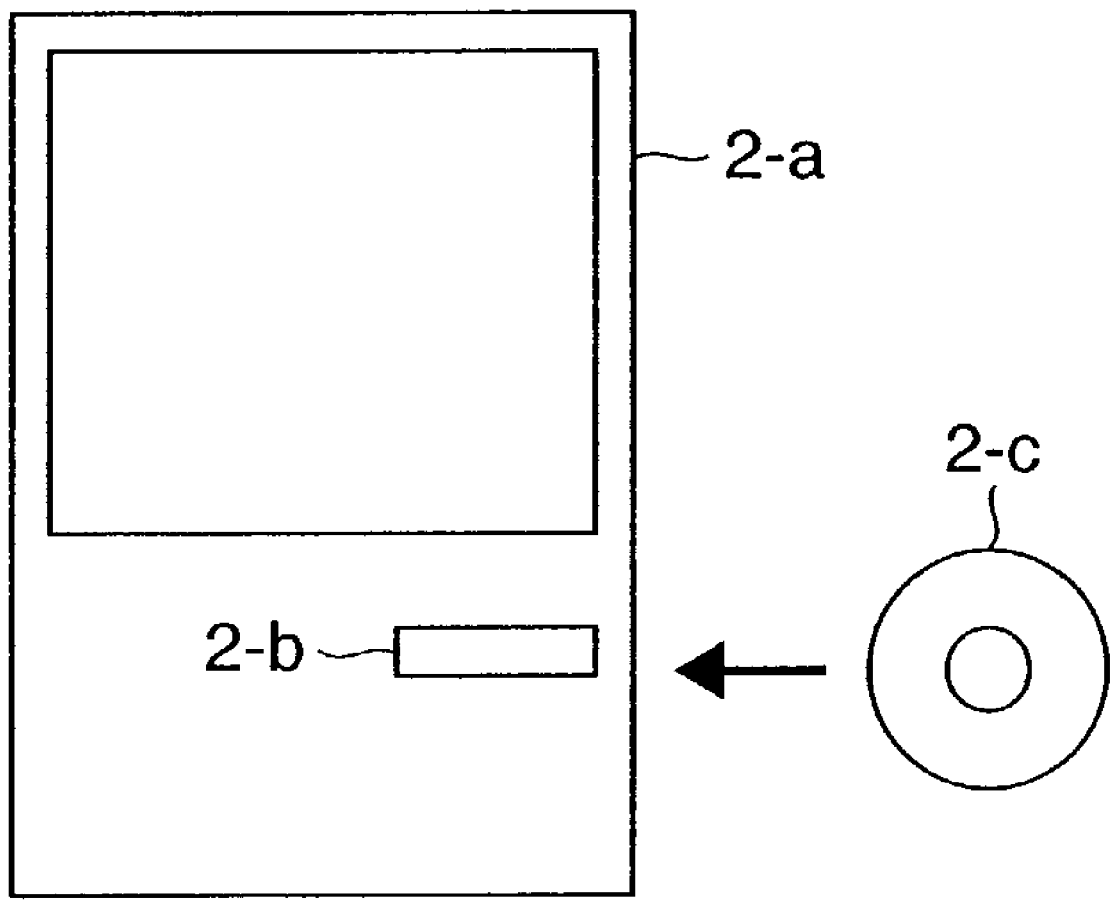
FIG. 2 is a view showing an implementation in which data such as a computer program is loaded from a medium which stores a computer program for realizing the apparatus of the embodiment.

As shown in FIG. 2, the computer program of the embodiment can be loaded from a medium which stores the computer program. The storage medium which stores the computer program is also included in the embodiment. In FIG. 2, reference numeral 2-*a* denotes an information processing apparatus shown in FIG. 1; 2-*b*, a drive device into which the storage medium is inserted; and 2-*c*, a medium which stores the above-mentioned computer program.

Referring back to FIG. 1, a hard disk (DISK) functions as an external memory for storing various data and the like. The hard disk (DISK) incorporates a storage medium capable of reading/writing a large amount of information at a relatively high speed. The storage medium allows storing and extracting various data and the like, as needed. If necessary, stored computer programs and data are completely or partially invoked in accordance with a keyboard instruction or instructions by various computer programs.

A memory card (MemCard) is a detachable storage medium. Information is stored in the memory card (MemCard), the memory card (MemCard) is connected to another device, and the stored information can be referred to and transferred.

A keyboard (KB) has character symbol input keys such as alphanumeric keys, hiragana keys, katakana keys, and a period key, and various function keys such as a cursor control key which designates to move the cursor.

The contents of a cursor register (CR) are read out and written by the microprocessor (CPU). A CRT controller (CRTC) to be described later displays the cursor at a position on a display (CRT) that corresponds to an address stored in the cursor register (CR). A display buffer memory (DBUF) accumulates data patterns to be displayed.

The display controller (CRTC) displays contents accumulated in the cursor register (CR) and display buffer memory (DBUF) on the display CRT.

The display CRT uses a cathode-ray tube, liquid crystal, and the like. The display of a display pattern and cursor made up of dots on the display (CRT) is controlled by the display controller (CRTC). A character generator (CG) stores the patterns of characters and symbols to be displayed on the display (CRT).

An NCU allows the apparatus or means of this embodiment to communicate with another apparatus or means. By using the NCU, programs and data of this embodiment can be shared with another apparatus or means. In FIG. 1, the NCU is connected via a computer network (LAN) to a personal computer (PC), a reception/accumulation/display device (TV/VR) for a television broadcasting program, an image shot by the user, and the like, and a home game computer (GC). The apparatus of this embodiment can freely exchange information with these devices via the NCU.

Needless to say, the device connected to the apparatus of this embodiment is not particularly limited. In addition, the network type is not particularly limited, and the network need not be a closed network in FIG. 1 but can be a network connected to an external network.

A DTU is a portion which realizes a multi-address calling reception function using an artificial satellite or the like. The DTU has a function of receiving, by a parabolic antenna (ANT), radio waves broadcast via the artificial satellite, and extracting broadcast content information. Multi-address calling has various forms: information is broadcast by ground waves, information is broadcast via a coaxial cable or optical cable, or information is distributed by the above-mentioned LAN or a large-scale network. Multi-address calling can take any form.

The information processing apparatus of the embodiment having the above arrangement implements a content use apparatus having a function of editing and processing a multimedia content such as a moving picture or still picture, and also processing metadata. A content and its metadata are generally stored in a memory device such as the hard disk (DISK) or memory card (MemCard) in FIG. 1 or an external memory device connectable via the NCU or DTU in FIG. 1. The content may be a moving picture, still picture, or the like, and the recording format of the content is not particularly limited. This also applies to metadata, and any description format and recording format can be adopted as long as the metadata holds information according to the embodiment. In the following description, a format in which metadata described in XML is added to a video content will be exemplified.

FIG. 3 is a view showing an XML description example of metadata for a video content according to the first embodiment. This description will be explained in detail below.

A line 3-*a* describes that metadata continues after the line 3-*a*. The line 3-*a* is described for discrimination of metadata because, when data is described in XML, information except the metadata may be described. A line 3-*y* describes the end of the description of the metadata. Lines 3-*b* to 3-*x* describe metadata.

As metadata contents, the line 3-*b* designates the range of a content to which the metadata is added, i.e., an addition range. The line 3-*b* describes that the addition range of the metadata is from 0:2:12 to 0:4:34 in the video content. The contents of the metadata added to this addition range are described subsequent to the line 3-*b*. The line 3-*x* represents the end of the description of the metadata applied to this addition range. This means that the metadata corresponding to the addition range is described up to the line 3-*w*. The metadata contains three metadata items 3-*c* to 3-*j*, 3-*k* to 3-*q*, and 3-*r* to 3-*x*.

The lines 3-*c* to 3-*j* describe, as added metadata, the dominant color of the moving picture content of the video content within the addition range. The line 3-*c* describes the start of the metadata, and the line 3-*j* describes the end of the description. The line 3-*i* describes the dominant color by R, G, and B values. The dominant color is used for searching for a video content, and is a kind of metadata.

The lines 3-*d* to 3-*h* describe data for determining whether the metadata is available, and represent the metadata content of the metadata. Data of this type will be called metametadata. The line 3-*d* describes the start of the description of the metametadata, and the line 3-*h* represents the end of the description. The line 3-*e* describes the contents of metametadata, and represents that the dominant color metadata becomes unavailable if color change (ColorChange) operation is performed within the metadata addition range (represents that color change operation is disable operation (DisableOperation)). Similarly, the line 3-*f* represents that the dominant color metadata becomes unavailable if cut and paste in video editing (VideoEdit) are performed within the metadata addition range. The line 3-*g* represents that color change operation has actually been done for the video content portion within the addition range.

The lines 3-*k* to 3-*q* describe metadata about a dialog within the addition range. The description structure is the same as that of the dominant color. More specifically, the line 3-*p* describes metadata whose content is a word "Hello". The line 3-*m* describes metametadata, and represents that the metadata becomes unavailable if audio information change (AudioChange) is done within the addition range of the video content. The line 3-*n* represents that color change operation has been done for the video content portion within the addition range.

The lines 3-*r* to 3-*w* describe metadata about a photographing object within the addition range. The description structure is the same as those of the dominant color and dialog. More specifically, the line 3-*t* represents, as photographing object metadata, that a person is photographed in a moving picture within the target segment and his name is "Ichiro Suzuki". The lines 3-*s* to 3-*u* describe metametadata, and represent that the metadata is effective regardless of operation performed for the video content portion within the addition range (3-*t*: DisableOperation=Nothing).

Unlike the above-described two metametadata, the metametadata on the lines 3-*s* to 3-*u* does not describe the record of color change operation. This is because an item described in the lines 3-*r* to 3-*w* is added after color change operation. An item is added when, for example, data in different segments are connected in video editing and metadata in the respective segments are concatenated. By repeating various editing operations, various values are readily set for metadata even on the same video content.

Figure 7:
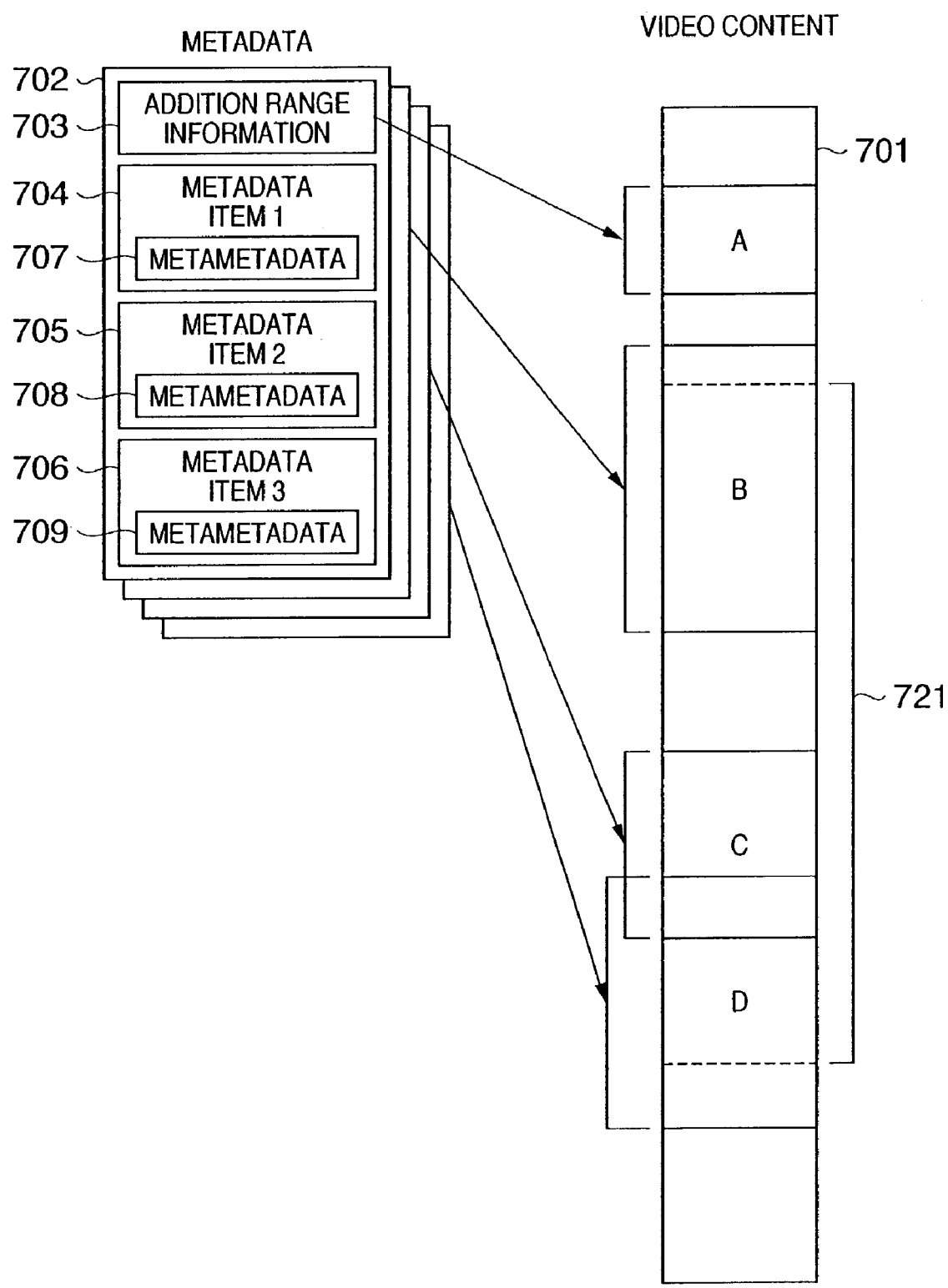
FIG. 7 is a schematic view for explaining addition of metadata to a video content.

Such metadata is described for each addition range. FIG. 7 is a schematic view for explaining addition of the above-mentioned metadata to a video content. Reference numeral 701 denotes a video content to which metadata are added in four addition ranges in FIG. 7; and 702, a data arrangement for one metadata which complies with the description in FIG. 3. The metadata 702 contains addition range information 703 representing the metadata addition range in the video content, and metadata items 704 to 706 (the number of metadata items is not particularly limited) representing metadata such as a dominant color. The metadata items 704 to 706 respectively contain metametadata 707 to 709 for determining the effectiveness of the metadata.

In this manner, metadata of the first embodiment is added to a content such as a moving picture. Determination information for determining the effectiveness of each item of the metadata is added as metametadata. Both the metadata and metametadata are made available in each device. Each content has metametadata which is a redundant portion. However, when the content is edited and processed, each device can determine by using the metametadata information whether each item of the metadata is available. Even a device which does not cope with the metadata item can determine the effectiveness of the item. Determination processing is done in each device, and processing operation can be distributed. That is, metadata processing is determined from metadata (metametadata) for the metadata within an assigned processor. The first embodiment can, therefore, provide an arrangement and operation which do not adopt a central portion for designating processing, unlike the technique disclosed in Japanese Patent Laid-Open No. 08-077116, but enable distributing processing, and can be applied to even metadata unknown to each device.

Figure 4:
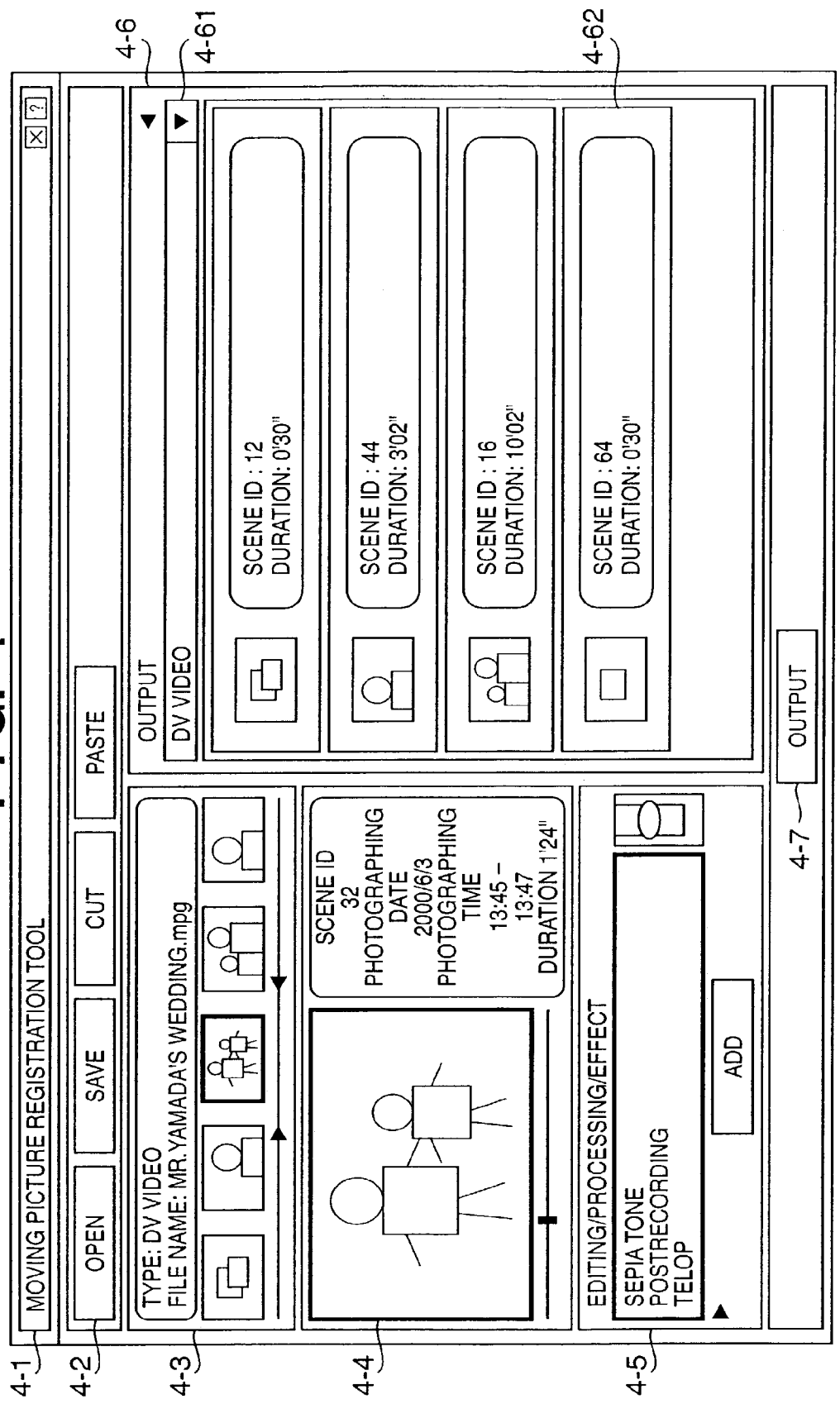
FIG. 4 is a view showing a window when a video content is edited and processed in the apparatus of the embodiment.

FIG. 4 shows a window in which a video content actually undergoes video data editing and processing. This is a window example in the use of the window system. The window is displayed on the display CRT via the display controller CRTC and character generator CG in FIG. 1.

Reference numeral 4-1 denotes a title bar on which the operation of the entire window such as move or size change is done; and 4-2, a tool bar which allows easily invoking main functions within the window.

Reference numeral 4-3 denotes a region for selecting the scene of a moving picture or still picture to be edited/processed. FIG. 4 illustrates processing of a scene in a moving picture file "Mr.Yamada's Wedding.mpg" recorded by a digital video recorder. An arbitrary segment within the moving picture can be designated to select a scene by operating the slider on the tab with an input device such as the keyboard KB in FIG. 1.

In the region 4-3 of FIG. 4, an image within the bold frame is one shot (one frame) at the start of a currently selected scene. Similar images can be checked for preceding and succeeding scenes. The user can select, as one scene, a segment within the video content to be edited and processed. The first embodiment is mainly directed to editing, processing, and playback of multimedia data. The present invention can be adopted as some functions of an apparatus or means for various usages such as search of multimedia data. A more advanced function can be achieved by eliminating functions except the feature of the present invention or adding various functions. All these cases are incorporated in the present invention.

Reference numeral 4-4 denotes a region for playing back and checking a scene selected in the region 4-3. An arbitrary shot or frame in the scene can be freely moved and checked by operating a tab called a slider. Information such as the photographing time of the scene may also be displayed in the region 4-4. Using this region, the user can grasp the contents of the selected scene.

Reference numeral 4-5 denotes a region for designating editing, processing, effect, and the like for a segment cut out in the regions 4-3 and 4-4. Arbitrary editing, processing, and effect are selected in the region 4-5, and the "Add" button is clicked. Then, the designated editing, processing, and effect are executed and additionally registered in a region 4-62. At this time, metadata processing using metametadata of this embodiment is performed. The processing contents will be described later.

Reference numeral 4-6 denotes a region which provides a function of arranging edited/processed video data, outputting the video data, and storing them as a video content usable by the apparatus together with metadata and metametadata; and 4-61, a region for designating the output format. Video data which are extracted in the regions 4-3, 4-4, and 4-5 and if necessary, edited are arranged in the region 4-62. By changing the order, the final order in the video content can be designated and changed.

Reference numeral 4-7 denotes an output button for designating to output video data in the region 4-6 as one video content.

Figure 5:
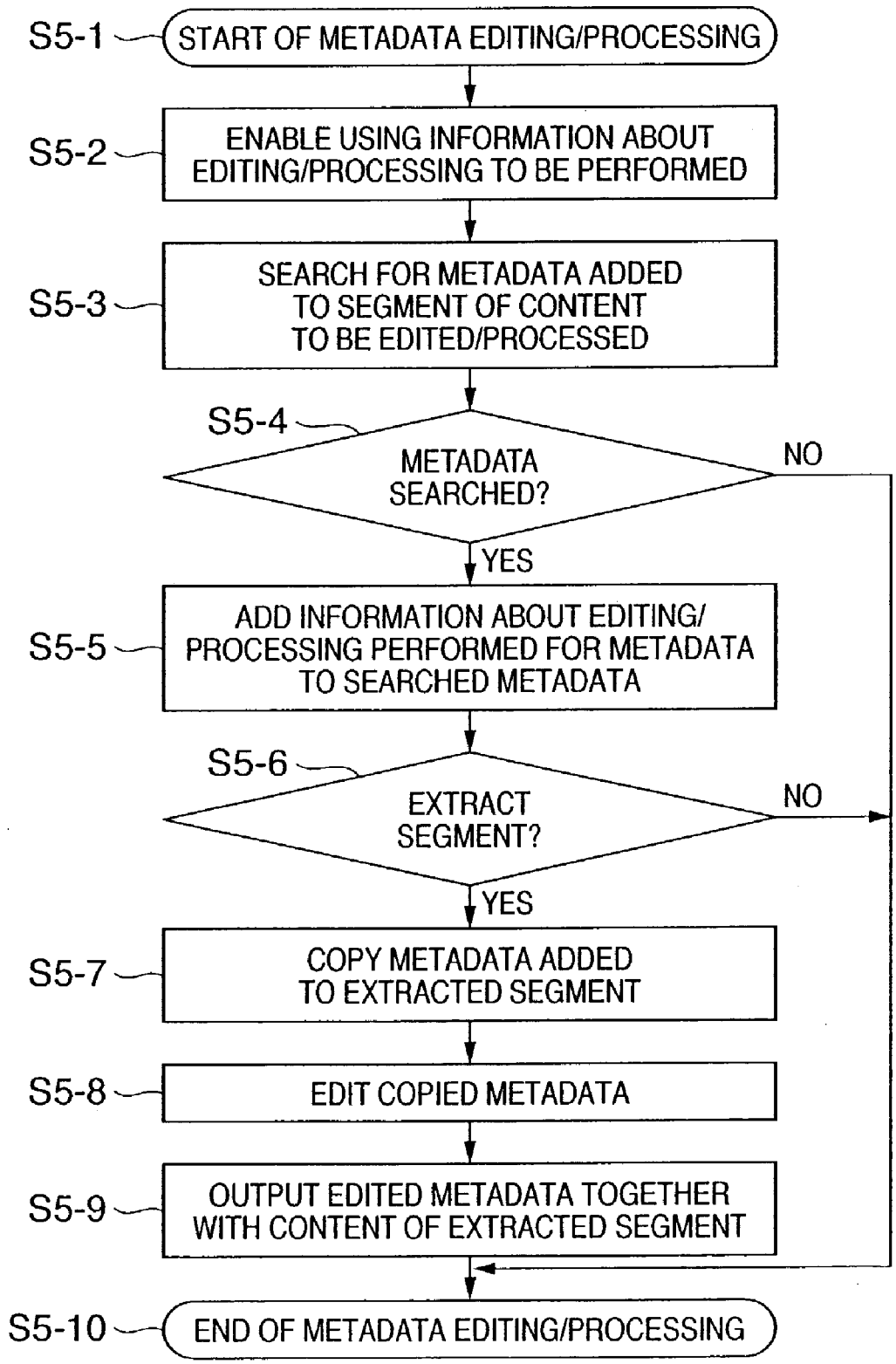
FIG. 5 is a flow chart schematically showing processing contents and procedures for metadata when a video content segment is designated, edited, and processed in an apparatus of the first embodiment.

FIG. 5 is a flow chart schematically showing processing procedures for metadata when a video data segment is designated, edited, and processed. Processing in FIG. 5 is realized as, e.g., computer programs. In executing these computer programs, the whole processing may be performed by one apparatus, partially performed one by one by a plurality of apparatuses, or parallel-performed by a plurality of apparatuses.

Processing contents and procedures shown in FIG. 5 will be described. If a video data segment is designated, and editing and processing are designated, the processing starts from step S5-1.

In step S5-2, metadata to be processed in this processing, metametadata for the metadata, and information about the designated editing/processing contents are prepared in advance so as to use them. This can be achieved by various methods. For example, each information is read out from DISK or MemCard as the storage medium of FIG. 1, the format is converted, and the resultant information is located in the RAM of FIG. 1 for easy use.

In step S5-3, the segment to be edited/processed is searched for metadata corresponding to the entire segment or part of the segment. For example, if a segment 721 is extracted as an editing/processing target, metadata whose addition ranges are portions B, C, and D of the video content are extracted. In this case, metadata whose addition range is a portion A is not selected.

In step S5-4, whether metadata which requires the use of metametadata exists in the metadata subjected to the current processing is checked from the search result in step S5-3. If NO in step S5-4, the processing ends; if YES, shifts to step S5-5.

In step S5-5, the processing content of the current editing/processing is added as editing log metametadata to the metametadata description regions (707 to 709 in FIG. 7) for the respective metadata. Note that the editing log is added as metametadata to each metadata item.

In step S5-6, whether to extract the content segment designated in editing and processing is determined. That is, whether to arrange the extracted segment in the region 4-62 of FIG. 4 is determined. If NO in step S5-6, the processing ends. As a result, the edited metadata is held as metadata of the video content.

If YES in step S5-6, the processing shifts to step S5-7, and metadata (metadata searched in step S5-3) corresponding to each segment, part or all of which is contained in the extracted segment, is copied to the work area of the memory. In step S5-8, necessary editing is performed. For example, metadata corresponding to the segments B and D in FIG. 7 are partially discarded, and thus a message (VideoEdit) that video editing has been done is additionally described as metametadata. The addition ranges of metadata corresponding to the segments B, C, and D are changed in accordance with positions after editing.

In step S5-9, the edited metadata are output together with the extracted content. In step S5-10, the processing ends.

The above-described processing is repeated, and if the output button 4-7 is finally clicked, the contents of extracted segments arranged in the region 4-61 are concatenated in the arrangement order and output as one moving picture file. At this time, the metadata edited in step S5-8 are added to the new content.

Figure 6:
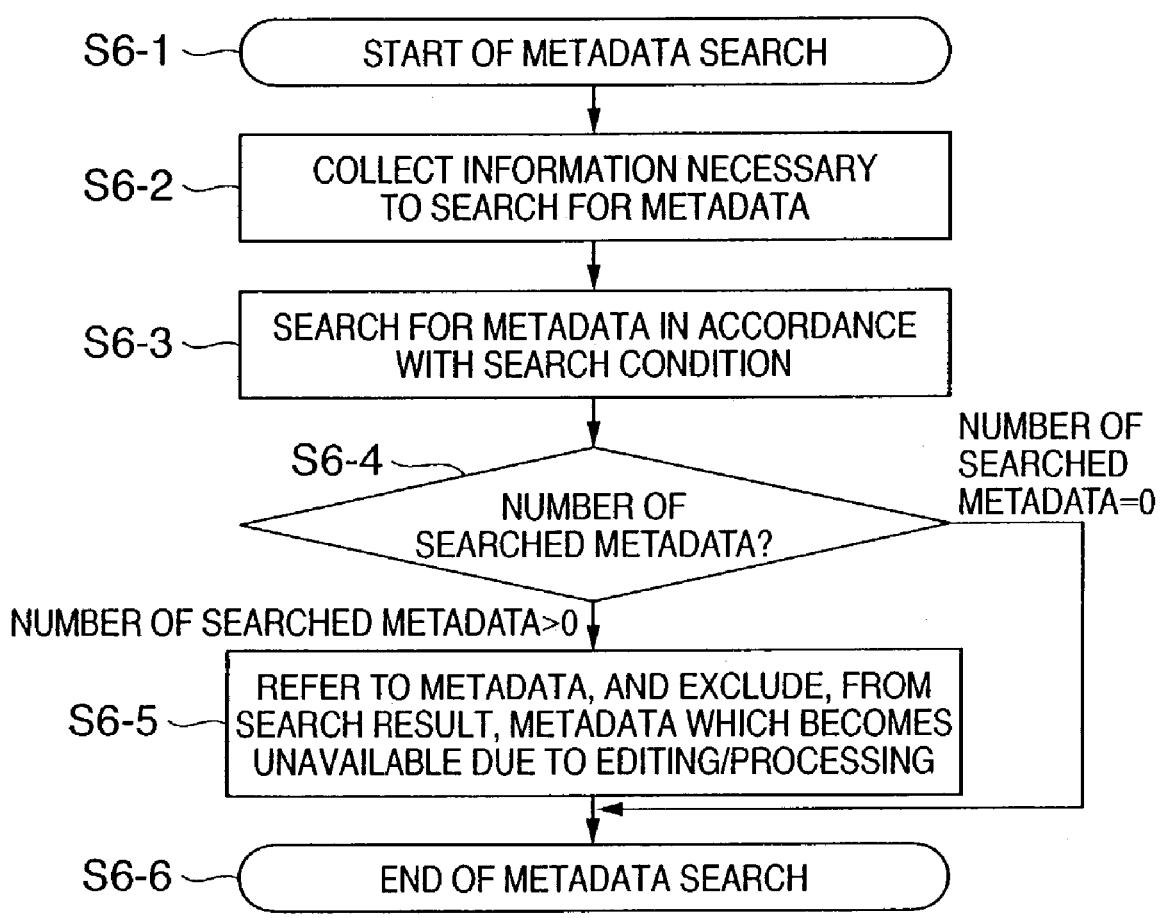
FIG. 6 is a flow chart schematically showing processing contents and procedures when a video content segment is designated and searched in the apparatus of the first embodiment.

Meta data search procedures shown in FIG. 6 will be explained. This processing corresponds to search of a video content (or segment) using a keyword.

If a segment is designated as video data, and search or the like is designated, the processing starts from step S6-1.

Search will be exemplified in this case, but any operation for a content referring to metadata and any operation regarding metadata can be applied to the present invention.

In step S6-2, metadata to be processed in this processing, and metametadata for the metadata are prepared in advance so as to search for them. This can be achieved by various methods. For example, each information is read out from DISK or MemCard as the storage medium of FIG. 1, the format is converted, and the resultant information is located in the RAM of FIG. 1 for easy use. In step S6-3, corresponding metadata is searched for in accordance with the segment designated by the search condition and the type of metadata.

In step S6-4, whether candidate metadata as the current search result exists is checked. If candidate metadata exists, the processing shifts to step S6-5; if NO, to step S6-6. Step S6-5 is processing in the presence of candidate metadata as the current search result. In step S6-5, metametadata is checked for each metadata, and whether the metadata is available is determined. If the metadata is unavailable, the metadata is excluded from search result candidates.

For example, metadata and metametadata as shown in FIG. 3 exist, the line 3-e describes as metametadata that dominant color metadata becomes unavailable if color change operation is done, and the line 3-g records that color change operation has been done. From these two descriptions, the dominant color metadata is determined not to be available. Similarly, the line 3-m describes audio information change as disable operation for dialog metadata. The line 3-n describes that only color change operation has been done. Thus, the dialog metadata is determined to be available. For photographing object metadata, no editing log metametadata exists. The photographing object metadata is determined to be available.

For example, sepia processing of changing the color to a retro color tone like an old photograph is performed as color change operation. Since sepia processing changes the color tone, the dominant color metadata value must be calculated again and cannot be directly used. To the contrary, information such as a sound, another photographed object, or the layout is not changed. This leads to the above determination. When postrecording processing of rewriting audio information is performed, the moving picture portion is not changed, and color information metadata is kept available. However, the dialog may be changed or deleted, and the dialog metadata becomes unavailable. That is, the dialog metadata becomes unavailable, but other metadata can be kept available.

Depending on the editing/processing content, some metadata become available, but some metadata become unavailable. In the first embodiment, determination information for determining metadata from this viewpoint is described as metametadata in the metadata. Whether metadata is available can be determined using metametadata added to the metadata. Even a device which does not cope with the metadata can determine the metadata. Also, this processing can be distributed.

This arrangement can prevent addition of incorrect metadata even upon editing and processing a multimedia content when various metadata are added to the multimedia content. Content operation using metadata can be easily, correctly performed, and the user can easily, effectively utilize the multimedia content function.

When various multimedia contents such as a moving picture, still picture, and sound are edited and processed, as described above, the characteristic or state of each metadata should be changed, or some metadata may become unavailable. According to the first embodiment, the metadata state can be changed by describing the editing log as metametadata regardless of whether the device which has edited and processed the content can process the metadata. Note that metadata is used to search for, edit, and process a multimedia content.

More specifically, the first embodiment can provide a means (metametadata) for determining not only for metadata known to the device but also for unknown metadata whether at least the metadata is available after editing and processing when a multimedia content such as a moving picture or still picture undergoes operations such as editing and processing. As a result, metadata can be correctly used.

Even if a multimedia content is edited and processed in a device which does not cope with metadata, whether the metadata is available in a device which copes with metadata can be determined.

In this fashion, even when a multimedia content to which various metadata are added is edited and processed, the effectiveness of each metadata can be accurately determined. A device which utilizes metadata can easily, correctly perform use and operation such as search using the metadata. The user can easily, effectively utilize the multimedia content.

Second Embodiment

In the first embodiment, metametadata described at each metadata item describes, as "DisableOperation", editing of disabling the metadata item, as shown in FIG. 3. In the second embodiment, a reference destination for acquiring a disable condition (editing) is described.

FIG. 8 is a view showing an XML description example of metadata for a video content according to the second embodiment. This description will be explained in detail below.

A line 8-*a* describes that metadata continues after the line 8-*a*. The line 8-*a* is described for discrimination because, when data is described in XML, information other than metadata may be described. A line 8-*x* describes the end of the description of the metadata. Lines 8-*b* to 8-*w* describe metadata.

As metadata contents, the lines 8-*b* to 8-*d*, 8-*f* to 8-*k*, 8-*m* to 8-*r*, and 8-*t* to 8-*w* have the same descriptions as those of the lines 3-*b* to 3-*d*, 3-*g* to 3-*l*, 3-*n* to 3-*s*, and 3-*u* to 3-*x* in FIG. 3, and the meanings of these descriptions are also the same. In FIG. 8, the description of processing of disabling metadata is different from that in FIG. 3. The lines 8-*e*, 8-*l*, and 8-*s* are described in place of the descriptions of the lines 3-*e* and 3-*f*, 3-*m*, and 3-*t* in FIG. 3. These descriptions will be explained.

The line 8-*e* describes the contents of metametadata, and stores information necessary to acquire determination information about an operation which disables the use of metadata if this operation is executed within the metadata addition range. In the second embodiment, this information is described as a URL which is access information for acquiring information from a network. The URL is merely an example, and any information can be employed as far as determination information can be reliably acquired. This also applies to the lines 8-*l* and 8-*s*.

In the second embodiment, a segment in the video content is extracted. Even this operation may change the availableness of metadata. When the addition ranges of dominant color metadata and dialog metadata in this embodiment are partially designated as a segment where the video content is to be edited and processed, these metadata become unavailable, but photographing object metadata is kept available. For this reason, metametadata are recorded in the above way. In step S5-8, VideoEdit is added to the editing log.

For some metadata, the availableness may change depending on the cutting method, i.e., whether to cut the first or second half of a segment corresponding to metadata in segment extraction. As a measure against this, the description of an editing log representing the cutting state and a description representing whether metadata is available or unavailable upon operation are recorded as metametadata. This allows accurately determining whether metadata is available.

This arrangement can prevent addition of incorrect metadata even upon editing and processing a multimedia content when various metadata are added to the multimedia content. A device which utilizes metadata can easily, correctly perform use and operation such as search using the metadata. The user can easily, effectively utilize the multimedia content use function.

In step S5-8 of the second embodiment, a segment is changed along with cutting for extracted metadata, and the editing log is added to each item. Metadata may also be automatically updated in accordance with an edited content.

Update processing includes the following processes.

(1) The disable operation description and editing log description are compared. A metadata item determined to be ineffective is changed in accordance with an edited content. For example, for the dominant color, a dominant color is calculated from the content in the metadata segment and set as new metadata. In this case, the metadata may update the old metadata item, or the updated data may be added as a new metadata item (the metadata item before update is left).

(2) The disable operation description and editing log description are compared. A metadata item determined to be ineffective is deleted from the metadata.

(3) The disable operation description and editing log description are compared. A metadata item determined to be ineffective is changed if it can be corrected in the apparatus, or deleted if it cannot be corrected.

Figure 9:
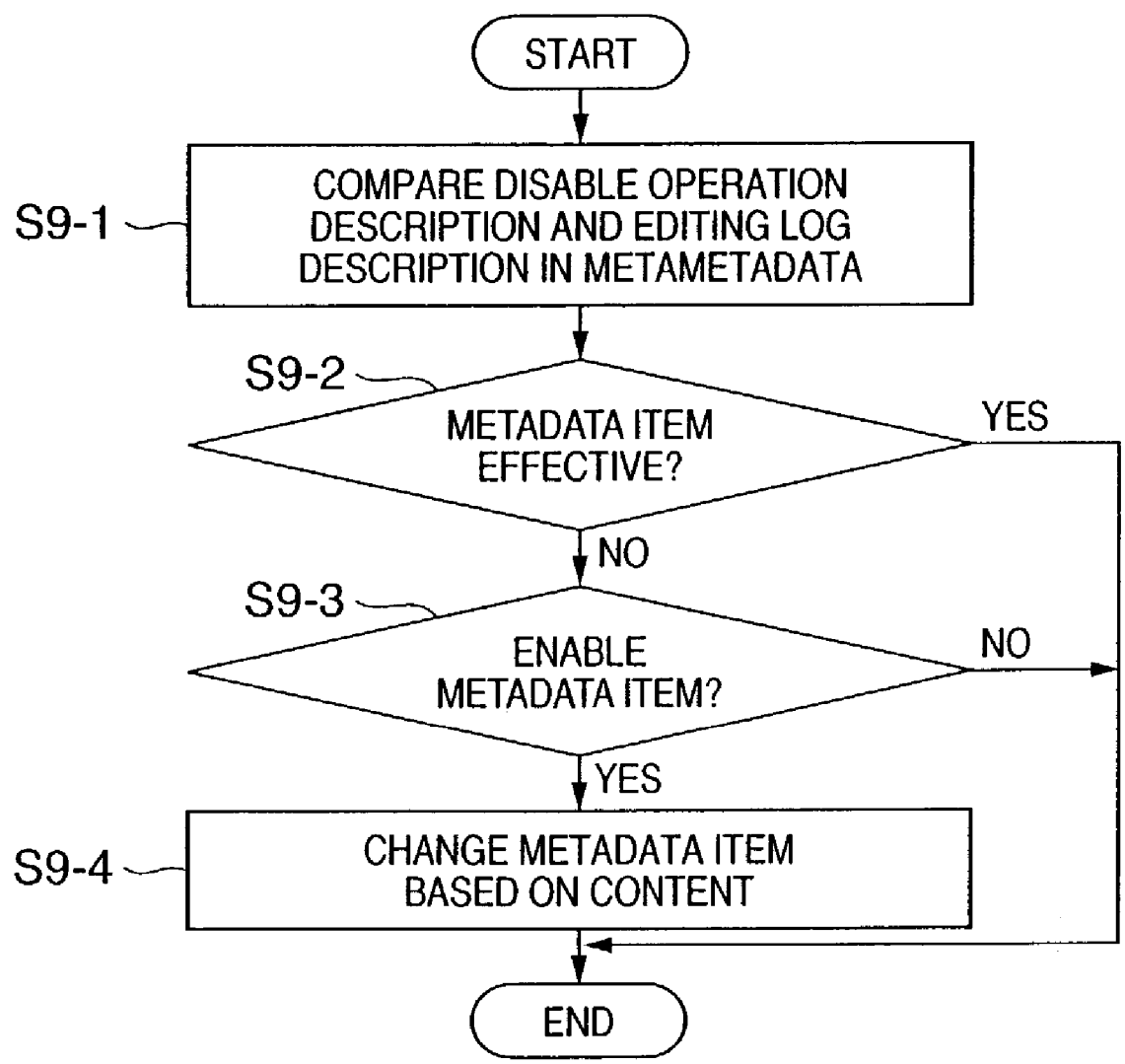
FIG. 9 is a flow chart for explaining automatic metadata editing.

FIG. 9 is a flow chart for explaining an example of automatic metadata editing. In step S9-1, the effectiveness of a metadata item is determined based on the description in metametadata. For example, disable operation described in the lines 3-*e* and 3-*f* of FIG. 3 and the editing log described in the line 3-*g* are compared to determine whether the metadata item is effective.

If the metadata item is ineffective, the processing shifts from step S9-2 to step S9-3 to determine whether the metadata item can be corrected. For example, the metadata item whose effectiveness is determined by metametadata described in the lines 3-*e* and 3-*f* is the dominant color (DominantColor). In this case, whether the device has a function of calculating the dominant color is checked. If YES in step S9-3 (the device has a correction function), the processing shifts to step S9-4. Metadata is acquired based on data within the metadata addition range in the content (in this case, the dominant color is calculated), and the metadata item is corrected. At this time, the editing log of the metametadata of the metadata item is reset.

To execute delete processing (2), steps S9-3 and S9-4 are replaced by delete processing. To execute processing (3), processing of deleting an item if the item is determined in step S9-3 to be uncorrectable is added.

Third Embodiment

The third embodiment will be described. The arrangement of an information processing apparatus in the third embodiment is the same as that in the first embodiment (FIGS. 1 and 2), and a description thereof will be omitted.

FIG. 10 is a view showing an XML description example of metadata for a video content according to the third embodiment. This description will be explained in detail below.

A line 10-$a$ describes that metadata continues after the line 10-$a$. The line 10-$a$ is described for discrimination because, when data is described in XML, information other than metadata may be described. A line 10-$y$ describes the end of the description of the metadata. Lines 10-$b$ to 10-$x$ describe metadata.

As metadata contents, the line 10-$b$ designates the range of a content to which the metadata is added, i.e., an addition range. The line 10-$b$ describes that the addition range of the metadata is from 0:2:12 to 0:4:34 in the video content. The contents of the metadata added to this addition range are described subsequent to the line 10-$b$. The line 10-$x$ represents the end of the description of the metadata applied to this addition range. This means that the metadata corresponding to the addition range is described up to the line 10-$w$. The metadata contains three metadata items 10-$c$ to 10-$i$, 10-$j$ to 10-$o$, and 10-$p$ to 10-$w$.

The lines 10-$c$ to 10$i$ describe, as added metadata, the dominant color of the moving picture content of the video content within the addition range. The line 10-$c$ describes the start of the metadata, and the line 10$i$ describes the end of the description. The line 10-$h$ describes the dominant color by R, G, and B values. The dominant color is used for searching for a video content, and is a kind of metadata.

The lines 10-$d$ to 10-$g$ describe data for determining whether the metadata is available, and represent the metadata content of the metadata, i.e., metametadata. The line 10-$d$ describes the start of the description of the metametadata, and the line 10-$g$ represents the end of the description. The line 10-$e$ describes the contents of metametadata, and represents that the dominant color metadata becomes unavailable if color change (ColorChange) operation is performed within the metadata addition range (represents that color change operation is disable operation (DisableOperation)). Similarly, the line 10-$f$ represents that the dominant color metadata becomes unavailable if cut and paste in video editing (VideoEdit) are performed within the metadata addition range.

The lines 10-$j$ to 10-$o$ describe metadata about a dialog within the addition range. The description structure is the same as that of the dominant color. More specifically, the line 10-$n$ describes metadata whose content is a word "Hello". The line 10-$l$ describes metametadata, and represents that the metadata becomes unavailable if audio information change (AudioChange) is done within the addition range of the video content.

The lines 10-$p$ to 10-$w$ describe metadata about a photographing object within the addition range. The description structure is the same as those of the dominant color and dialog. More specifically, the line 10-$t$ to 10-$v$ represent, as photographing object metadata, that a person is photographed in a moving picture within the target segment and his name is "Ichiro Suzuki". The lines 10-$q$ to 10-$s$ describe metametadata, and represent that the metadata is effective regardless of operation performed for the video content portion within the addition range (10-$r$: DisableOperation=Nothing).

Such metadata is described for each addition range. Metadata and metametadata are then added to a video content with the above-mentioned data arrangement in FIG. 7.

In this manner, metadata of the third embodiment is added to a content such as a moving picture. Determination information for determining the effectiveness of each item of the metadata is added as metametadata. Both the metadata and metametadata are made available in each device. Each content has metametadata which is a redundant portion. However, when the content is edited and processed, each device can determine by using the metametadata information whether each item of the metadata is kept available. Even a device which does not cope with the metadata item can determine the effectiveness of the item. Determination processing is done in each device, and processing operation can be distributed. That is, metadata processing is determined from metadata (metametadata) for the metadata within an assigned processor. The third embodiment can, therefore, provide an arrangement and operation which do not adopt a central portion for designating processing, unlike the technique disclosed in Japanese Patent Laid-Open No. 08-077116, but enable distributing processing, and can be applied to even metadata unknown to each device.

Processing in editing and processing video data will be explained with reference to FIG. 4 and the flow chart (FIG. 11) showing processing of the third embodiment. The arrangement in FIG. 4 has already been described in the first embodiment, and a description thereof will be omitted.

Figure 11:
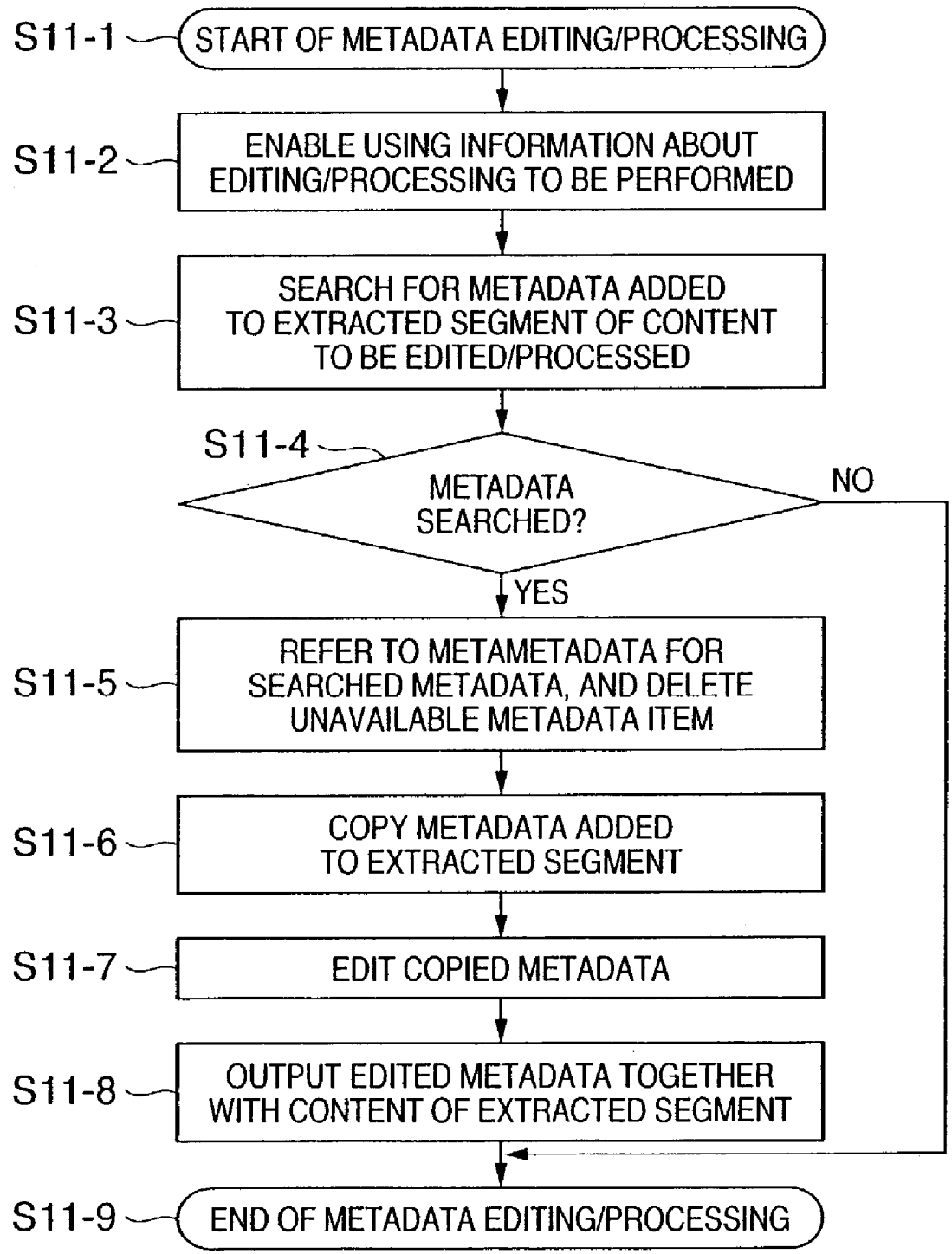
FIG. 11 is a flow chart schematically showing processing contents and procedures for metadata when a video content segment is designated, edited, and processed in the apparatus of the third embodiment.

FIG. 11 is a flow chart schematically showing processing procedures for metadata when a video data segment is designated, edited, and processed. Processing in FIG. 11 is realized as, e.g., computer programs. In executing these computer programs, processing may be performed partially or as a whole, performed by one or a plurality of apparatuses, or parallel-performed. In any case, the object of the present invention is achieved.

Processing contents and procedures shown in FIG. 11 will be described. If a video data segment is designated, and editing and processing are designated, the processing starts from step S11-1.

In step S11-2, metadata to be processed in this processing, metametadata for the metadata, and information about the designated editing/processing contents are prepared in advance so as to use them. This can be achieved by various methods. For example, each information is read out from DISK or MemCard as the storage medium of FIG. 1, the format is converted, and the resultant information is located in the RAM of FIG. 1 for easy use.

In step S11-3, the segment to be edited/processed is searched for metadata corresponding to the entire segment or part of the segment. For example, if a segment (extracted segment) 721 is extracted as an editing/processing target, metadata whose addition ranges are portions B, C, and D of the video content are extracted. In this case, metadata whose addition range is a portion A is not selected.

In step S11-4, whether metadata which requires the use of metametadata exists in the metadata subjected to the current processing is checked from the search result in step S11-3. If NO in step S11-4, the processing ends; if YES, shifts to step S11-5.

In step S11-5, the processing content described in metametadata and the editing/processing content which has actually been done for the extracted segment are compared for each metadata item, and whether the metadata item is kept effective for the processed content of the extracted segment is checked. A metadata item which becomes ineffective due to actual editing/processing is deleted.

For example, in the presence of metadata and metametadata as shown in FIG. 10, sepia processing of changing the color to a retro color tone like an old photograph and postrecording processing of rewriting audio information are performed as editing/processing for an extracted segment. In this case, sepia processing is "ColorChange" processing of changing the color tone, and postrecording processing is "AudioChange" processing of changing audio contents. The results of determining whether metadata as shown in FIG. 10 is kept effective are shown in FIG. 12.

Since sepia processing changes the color tone, the dominant color metadata value must be calculated again, and the dominant color metadata item (DominantColor) cannot be directly used. However, information such as a sound, another photographed object, or the layout is not changed. The dominant color metadata item is disabled by sepia processing, but is not disabled by postrecording processing.

Postrecording processing does not change a moving picture portion but may change or delete a dialog. The dialog metadata item (Dialog) becomes unavailable by postrecording processing, but other metadata can be kept available. Depending on the editing/processing content, some metadata become available, but some metadata become unavailable.

The third embodiment takes this situation into consideration, and enables determining the effectiveness of each metadata item by using metametadata added to the metadata. Even a device which does not cope with the metadata can determine the effectiveness of the metadata. Also, this processing can be distributed.

In step S11-6, metadata (metadata searched in step S11-3) that corresponds to a segment, part or all of which is contained in the extracted segment, and that has been updated in step S11-5 is copied to the work area of the memory. Instep S11-7, necessary editing is performed. For example, metadata corresponding to the segments B and D in FIG. 7 are partially discarded, and a metadata item to which video editing (DisableOperation VideoEdit) is designated as disable operation is deleted. In the example of FIG. 10, if the dominant color (DominantColor) metadata item is left at this point, it is deleted. In FIG. 7, the addition ranges of metadata corresponding to the segments B, C, and D are changed in accordance with positions after editing.

In step S11-8, the edited metadata are output together with the extracted content. In step S11-9, the processing ends.

The above-described processing is repeated, and if an output button 4-7 (FIG. 4) is finally clicked, the contents of extracted segments arranged in a region 4-61 are concatenated in the arrangement order and output as one moving picture file. At this time, the metadata edited in step S11-7 are added to the new content.

This arrangement can prevent addition of incorrect metadata even upon editing and processing a multimedia content when various metadata are added to the multimedia content. Content operation using metadata can be easily, correctly performed, and the user can easily, effectively utilize the multimedia content function.

When various multimedia contents such as a moving picture, still picture, and sound are edited and processed, as described above, the characteristic or state of metadata should be changed, or some metadata may become unavailable. In this case, according to the third embodiment, whether the metadata is kept available is determined by referring to metametadata regardless of whether the device which has edited and processed the content can process the metadata. Metadata (item) determined to be unavailable is deleted.

More specifically, according to the third embodiment, when a multimedia content undergoes operation such as editing and processing, whether at least metadata is available after editing and processing is determined not only for metadata known to the device but also for unknown metadata, and unavailable metadata is deleted. As a result, metadata can be correctly used.

As described above, even when a multimedia content to which various metadata are added is edited and processed, the effectiveness of each metadata can be accurately determined. Only effective metadata items are left, and use and operation such as search using metadata can be easily, correctly performed. The user can easily, effectively utilize the multimedia content.

Fourth Embodiment

In the third embodiment, metametadata described at each metadata item describes, as "DisableOperation", editing of disabling the metadata item, as shown in FIG. 10. In the fourth embodiment, a reference destination for acquiring a disable condition (editing) is described. Note that the apparatus arrangement and metadata update processing in the fourth embodiment are the same as those (FIGS. 1 and 5) in the third embodiment. Only the difference from the third embodiment will be explained.

FIG. 13 is a view showing an XML description example of metadata for a video content according to the fourth embodiment. This description will be explained in detail below.

A line 13-*a* describes that metadata continues after the line 13-*a*. The line 13-*a* is described for discrimination because, when data is described in XML, information other than metadata may be described. A line 13-*x* describes the end of the description of the metadata. Lines 13-*b* to 13-*w* describe metadata.

As metadata contents, the lines 13-*b* to 13-*d*, 13-*f* to 13-*j*, 13-*l* to 13-*p*, and 13-*r* to 13-*w* have the same descriptions as those of the lines 10-*b* to 10-*d*, 10-*g* to 10-*k*, 10-*m* to 10-*q*, and 10-*s* to 10-*x* in FIG. 10, and the meanings of these descriptions are also the same. In FIG. 13, the description of processing of disabling metadata is different from that in FIG. 10. The lines 13-*e*, 13-*k*, and 13-*q* are described in place of the descriptions of the lines 10-*e* and 10-*f*, 10-*l*, and 10-*r* in FIG. 10. These descriptions will be explained.

The line 13-*e* describes the contents of metametadata, and stores information necessary to acquire determination information about an operation which disables the use of metadata if this operation is executed within the metadata addition range. In the fourth embodiment, this information is described as a URL which is access information for acquiring information from a network. The URL is merely an example, and any information can be employed as far as determination information can be reliably acquired. This also applies to the lines 13-*l* and 13-*s*.

These descriptions allow an apparatus to access a designated URL and acquire information for determining whether each metadata item is kept available after editing a content. By referring to the URL, processing in step S11-5 of FIG. 11 can be executed.

In the fourth embodiment, a segment in the video content is extracted. Even this operation may change the availableness of metadata. When the addition ranges of dominant color metadata and dialog metadata in this embodiment are partially designated as a segment where the video content is to be edited and processed, these metadata become unavailable, but photographing object metadata is kept available. For this reason, in step S11-7, whether "DisableOperation VideoEdit" is described as metametadata is checked, and a corresponding metadata item is deleted.

For some metadata, the availableness may change depending on the cutting method, i.e., whether to cut the first or second half of a segment corresponding to metadata in segment extraction. As a measure against this, the description of editing log operation representing the cutting state is recorded as metametadata. The availableness of metadata can be more accurately determined.

A metadata item which becomes ineffective in step S11-5 is deleted in the fourth embodiment, but the present invention is not limited to this. For example, metadata determined to be ineffective may be calculated again on the basis of edited video data, and rewritten into effective metadata or added. For example, when the color is changed and the dominant color metadata is determined to be ineffective, the dominant color may be calculated again to update the metadata.

Accordingly, addition of incorrect metadata is prevented even when a multimedia content to which various metadata are added is edited and processed. A device which utilizes metadata can easily, correctly perform use and operation such as search using the metadata. The user can easily, effectively utilize the multimedia content use function.

The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium which stores the program codes constitutes the present invention.

The storage medium for supplying the program codes includes a floppy disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As has been described above, the present invention can reliably determine the effectiveness of each metadata.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus comprising:
   means for storing data on a computer-readable medium, said data having a content that is assigned metadata containing at least one item and having a first description, for each item, for representing an editing operation for the content that disables a corresponding item of the metadata;
   editing means for editing the content;
   description means for adding to the metadata a second description representing an editing operation that is performed by said editing means for the content; and
   determination means for determining an effectiveness of each item of the metadata based on the first and second descriptions.

2. The apparatus according to claim 1, wherein
   the first description describes an access destination for acquiring the editing operation of disabling the corresponding item, and
   said determination means acquires the editing operation of disabling the corresponding item from the access destination, and determines the effectiveness of the corresponding item based on the acquired editing operation and the editing operation represented by the second description.

3. The apparatus according to claim 1, further comprising operation means for operating on the content by referring to the metadata, wherein said operation means excludes from a reference object an item that is determined by said determination means to be ineffective.

4. The apparatus according to claim 3, wherein an operation on the content performed by said operation means includes a search of the content.

5. The apparatus according to claim 1, further comprising update means for updating, based on a corresponding content, a content of an item that is determined by said determination means to be ineffective.

6. The apparatus according to claim 5, wherein said update means registers an updated content of the item in the metadata.

7. The apparatus according to claim 1, further comprising delete means for deleting an item that is determined by said determination means to be ineffective.

8. The apparatus according to claim 1, further comprising change means for recalculating a metadata item that is determined by said determination means to be ineffective, and changing the metadata item in accordance with a result from said change means.

9. An information processing method comprising:
   a holding step of holding data on a computer-readable medium, said data having a content that is assigned metadata containing at least one item and having a first description, for each item, for representing an editing operation for the content that disables a corresponding item of the metadata;
   an editing step of editing the content;
   a description step of adding to the metadata a second description representing an editing operation that is performed in said editing step for the content; and
   a determination step of determining an effectiveness of each item of the metadata based on the first and second descriptions.

10. The method according to claim 9, wherein
    the first description describes an access destination for acquiring the editing operation of disabling the corresponding item, and
    said determination step includes acquiring the editing operation of disabling the corresponding item from the access destination, and determining the effectiveness of the corresponding item based on the acquired editing operation and the editing operation represented by the second description.

11. The method according to claim 9, wherein further comprising an operation step of operating on the content by referring to the metadata, wherein, in said operation step, an item that is determined in said determination step to be ineffective is excluded from a reference object.

12. The method according to claim 11, wherein an operation on the content performed in said operation step includes a search of the content.

13. The method according to claim 9, further comprising an update step of updating, based on a corresponding content, a content of an item that is determined in said determination step to be ineffective.

14. The method according to claim 13, wherein said update step includes registering an updated content of the item in the metadata.

15. The method according to claim 9, further comprising a delete step of deleting an item that is determined in said determination step to be ineffective.

16. The method according to claim 9, further comprising a change step of recalculating a metadata item that is determined in said determination step to be ineffective, and changing the metadata item in accordance with a recalculation result.

17. A computer-readable storage medium storing a control program that when executed causes a computer to perform an information processing method according to claim 9.

* * * * *

UNITED STATES PATENT AND TRADEMARK OFFICE
CERTIFICATE OF CORRECTION

PATENT NO. : 7,287,222 B2
APPLICATION NO. : 10/351300
DATED : October 23, 2007
INVENTOR(S) : Tomomi Takata et al.

It is certified that error appears in the above-identified patent and that said Letters Patent is hereby corrected as shown below:

COLUMN 1:

Line 31, "in home," should read --in the home,--
Line 34, "in home," should read --in the home,--
Line 40, "home." should read --home.--; and
Line 43, "in home," should read --in the home,--, and "to home" should read --to the home--.

COLUMN 2:

Line 24, "nonverval" should read --nonverbal--.

COLUMN 9:

Line 48, "Din FIG. 7" should read --D in FIG. 7--; and
Line 62, "Meta data" should read --Metadata--.

COLUMN 11:

Line 64, "available-" should read --availability--; and
Line 65, "ness" should be deleted.

COLUMN 13:

Line 28, "10-$c$ to 10$i$" should read --10-$c$ to 10-$i$--; and
Line 31, "line 10$i$" should read --line 10-$i$--.

COLUMN 16:

Line 66, "available-" should read --availability--; and
Line 67, "ness" should be deleted.

UNITED STATES PATENT AND TRADEMARK OFFICE
CERTIFICATE OF CORRECTION

PATENT NO. : 7,287,222 B2
APPLICATION NO. : 10/351300
DATED : October 23, 2007
INVENTOR(S) : Tomomi Takata et al.

It is certified that error appears in the above-identified patent and that said Letters Patent is hereby corrected as shown below:

COLUMN 17:

Line 7, "availableness" should read --availability--; and
Line 12, "availableness" should read --availability--.

COLUMN 19:

Line 4, "wherein" should be deleted.

Signed and Sealed this

Thirtieth Day of September, 2008

JON W. DUDAS
*Director of the United States Patent and Trademark Office*